US012602045B2

(12) United States Patent
Nishii et al.

(10) Patent No.: US 12,602,045 B2
(45) Date of Patent: Apr. 14, 2026

(54) AUTONOMOUS OPERATION METHOD, WORK VEHICLE, AND AUTONOMOUS OPERATION SYSTEM

(71) Applicant: Yanmar Holdings Co., Ltd., Osaka (JP)

(72) Inventors: Yasuto Nishii, Osaka (JP); Yuji Yamaguchi, Osaka (JP); Masaaki Murayama, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 128 days.

(21) Appl. No.: 17/751,535

(22) Filed: May 23, 2022

(65) Prior Publication Data

US 2022/0382278 A1     Dec. 1, 2022

(30) Foreign Application Priority Data

May 26, 2021     (JP) ................................. 2021-088417

(51) Int. Cl.
*G05D 1/00*          (2024.01)
*A01B 69/04*          (2006.01)

(52) U.S. Cl.
CPC ......... *G05D 1/0061* (2013.01); *A01B 69/008* (2013.01); *G05D 1/0088* (2013.01)

(58) Field of Classification Search
CPC ... G05D 1/0061; G05D 1/0088; A01B 69/008
USPC ......................................................... 701/50
See application file for complete search history.

(56) References Cited

U.S. PATENT DOCUMENTS

| | | | | |
|---|---|---|---|---|
| 2018/0310461 A1* | 11/2018 | Shinkai | ................ | A01B 69/001 |
| 2019/0286127 A1* | 9/2019 | Watanabe | ............ | B62D 15/025 |
| 2020/0192386 A1* | 6/2020 | Stenneth | ............ | G01C 21/3697 |
| 2022/0234591 A1* | 7/2022 | Kuehner | ................ | A41D 27/10 |

* cited by examiner

*Primary Examiner* — Mahmoud S Ismail
(74) *Attorney, Agent, or Firm* — Chris Mizumoto

(57) ABSTRACT

A combine harvester is a work vehicle capable of switching between a manual travel mode to travel based on operation of an operation tool including a steering wheel which is a turning operation tool and an autonomous traveling mode to travel based on a predetermined travel route, which includes a controller to function as an autonomous travel controller to control travel of the combine harvester through the autonomous travel mode based on the travel route. The combine harvester is switched from the autonomous travel mode to the manual travel mode without stopping the vehicle when the steering wheel is operated during the autonomous travel mode.

6 Claims, 9 Drawing Sheets

AUTONOMOUS OPERATION METHOD, WORK VEHICLE, AND AUTONOMOUS OPERATION SYSTEM

CROSS-REFERENCE

This application claims foreign priority of JP2021-088417 filed May 26, 2021, the disclosure of which is hereby incorporated by reference in its entirety.

TECHNICAL FIELD

This invention relates to an autonomous operation method of a work vehicle which performs autonomous travel based on a predetermined travel route, a work vehicle, and an autonomous operation system.

BACKGROUND ART

Conventionally, a work vehicle such as a combine harvester and a tractor is equipped with a turning operation actuator such as a steering wheel to instruct a vehicle to turn, and accepts an instruction of the turning operation from the turning operation actuator when the work vehicle is manually operated. Some work vehicles perform autonomous travel based on a preset traveling route. In autonomous travel, the work vehicle performs the turning operation based on the traveling route without accepting the instruction of the turning operation from the turning operation actuator.

For example, Patent Literature 1 discloses a harvester capable of traveling autonomously in a field. This harvester is equipped with an actuator having a function to enable a state of the vehicle to change while continuing traveling autonomously during autonomous travel, a vehicle state detection unit to detect the state of the vehicle, and a function setting unit to activate or deactivate the function according to the state of the vehicle detected by the vehicle state detection unit when the actuator is operated. For example, the actuator is a turning actuator to instruct the vehicle to turn. The function setting part deactivates the function of the turning actuator during autonomous travel and instruct the vehicle to stop turning when the turning actuator is operated by an amount greater than the preset one.

PRIOR ART DOCUMENT

Patent Document

Patent Document 1: Japanese Patent Laid-Open Publication No. 2020-18238

SUMMARY OF INVENTION

Technical Problem

However, in a conventional work vehicle such as the harvester disclosed in the Patent Literature 1, it is impossible to perform turning operation of the vehicle during autonomous travel mode, so that it was necessary to stop the vehicle once and switch it into manual travel mode when turning operation was desired. Therefore, when performing autonomous travel, operability is decreased because it is impossible to perform a trajectory correction as desired by the operator with a simple operation, and it is afraid that work efficiency is reduced because it is necessary to operate autonomous travel to suspend and stop the work vehicle every time the trajectory is corrected.

It is an object of the present invention to provide an autonomous travel method capable of performing autonomous travel with improved operability, a work vehicle, and an autonomous travel system.

Solution to Problem

In order to solve the problem mentioned above, an autonomous operation method of the present invention is provided, and the method of a work vehicle capable of switching between a manual travel mode to travel based on operation of an operation tool including a turning operation tool and an autonomous traveling mode to travel based on a predetermined travel route, includes: turning the work vehicle according to turning operation of the turning operation tool provided on the work vehicle; and controlling travel of the work vehicle based on the travel route through performing the autonomous travel mode, wherein when the turning operation tool is operated during the autonomous travel mode, the autonomous travel mode is switched to the manual travel mode without stopping the work vehicle.

Furthermore, in order to solve the problem mentioned above, a work vehicle of the present invention is provided, and the work vehicle capable of switching between a manual travel mode to travel based on operation of an operation tool including a turning operation tool and an autonomous traveling mode to travel based on a predetermined travel route, includes an autonomous travel controller to control travel through the autonomous travel mode based on the travel route, wherein when the turning operation tool is operated during the autonomous travel mode, the autonomous travel mode is switched to the manual travel mode without stopping the work vehicle.

Furthermore, in order to solve the problem mentioned above, an autonomous operation system of the present invention is provided, and the system including a work vehicle capable of switching between a manual travel mode to travel based on operation of an operation tool including a turning operation tool and an autonomous traveling mode to travel based on a predetermined travel route, includes an autonomous travel controller to control travel of the work vehicle through the autonomous travel mode based on the travel route, wherein when the turning operation tool is operated during the autonomous travel mode, the autonomous travel mode is switched to the manual travel mode without stopping the work vehicle.

Advantageous Effects of Invention

According to the present invention, it is possible to provide an autonomous operation method capable of performing autonomous travel with improved operability, a work vehicle, and an autonomous operation system.

DESCRIPTION OF EMBODIMENTS

Now, a combine harvester 1, which is an embodiment of a work vehicle according to an embodiment of the present invention, will be described with reference to FIG. 1, etc. The work vehicle enables to perform an autonomous travel based on a preset traveling route, and the combine harvester 1 performs a work such as reaping to harvest crops from grain culms planted in a field as well as travels a field to be worked on either by autonomous operation or by manual operation.

The combine harvester 1 is set to either a manual travel mode or an autonomous travel mode. When the combine harvester 1 is set to the manual travel mode, it is configured to perform a manual travel according to steering of a steering part 9 by an operator.

On the other hand, when the combine harvester 1 is set to the autonomous travel mode, it is configured to perform an autonomous reaping travel in which an autonomous reaping is performed by autonomous travel along a preset traveling route. For example, the combine harvester 1 performs a reciprocating reaping in which a plurality of work routes are reciprocated in an area with unreaped grain culms in the field (hereinafter referred to as unreaped area) and an autonomous reaping travel of a traveling pattern such as a whirl reaping in which a circumferential operation of the work route along an inner circumference of the unreaped area is repeated while the circumference is shifted toward a center.

Figure 1:
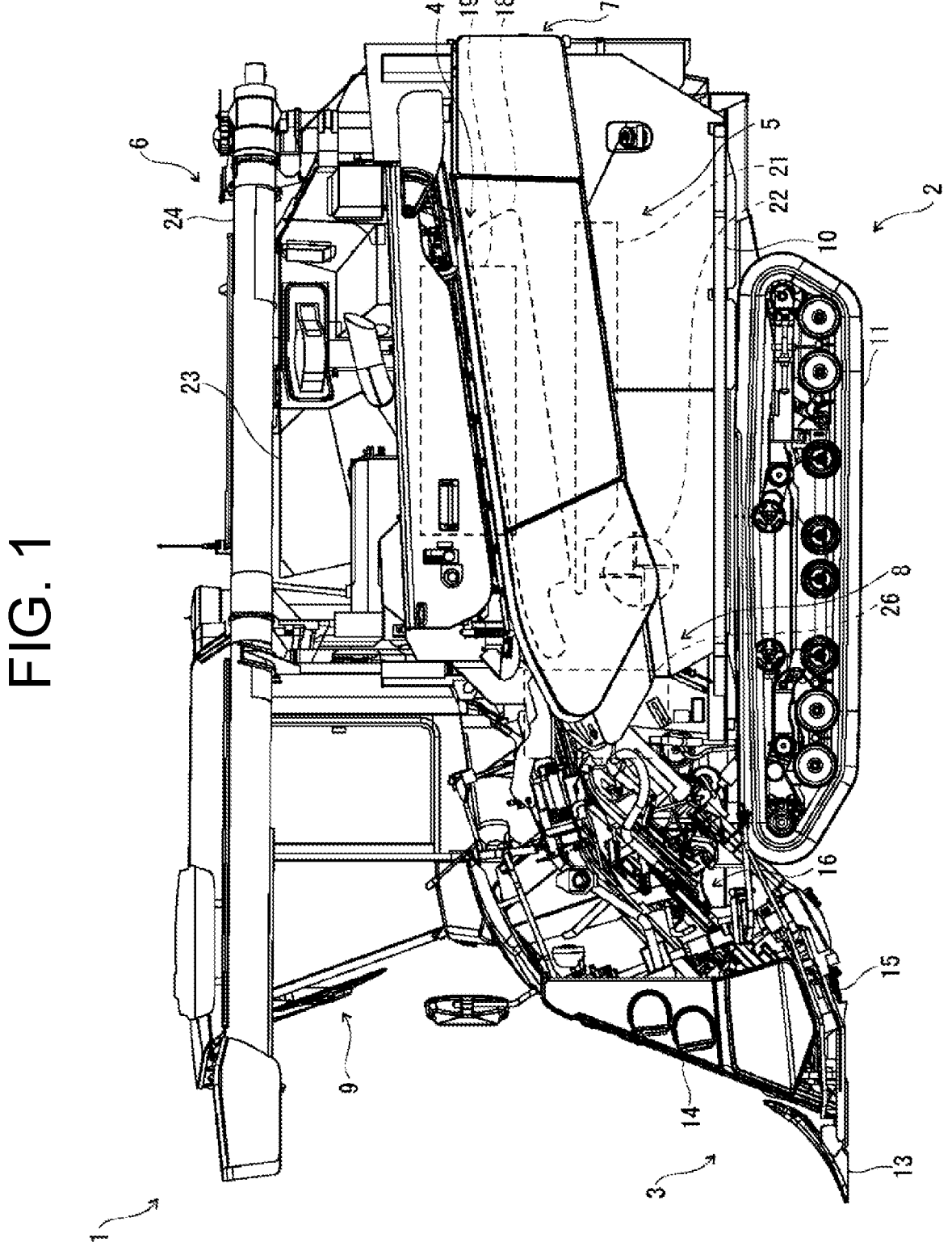
FIG. 1 is a side view of a combine harvester according to an embodiment of a work vehicle of the present invention.

As shown in FIG. 1, the combine harvester 1 is equipped with traveling part 2, reaping part 3, threshing part 4, sorting part 5, storage part 6, waste straw treating part 7, power unit 8, and steering part 9, and constitutes so-called auto-detachable type combine harvester. While traveling by the traveling part 2, the combine harvester 1 threshes in the threshing part 4 the grain culms reaped by the reaping part 3, sorts the grains in the sorting part 5, and stores the grains in the storage part 6. The combine harvester 1 causes the waste straw treating part 7 to treat the threshed waste straws. The combine harvester 1 drives traveling part 2, reaping part 3, threshing part 4, sorting part 5, storage part 6, and waste straw treating part 7 by power supplied by the power unit 8.

Figure 2:
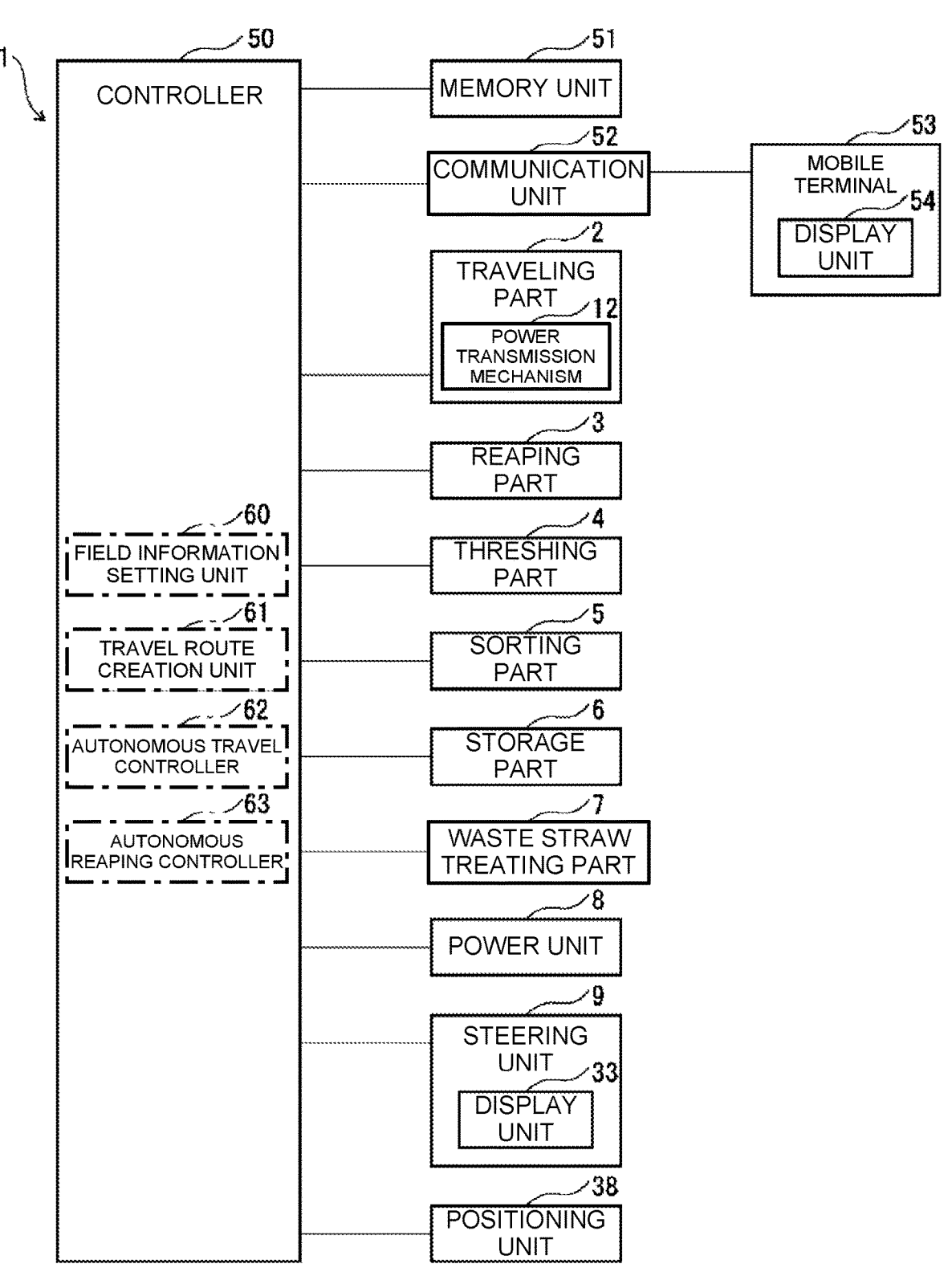
FIG. 2 is a block diagram of the combine harvester according to an embodiment of a work vehicle of the present invention.

The traveling part 2 is located under a body frame 10 and is equipped with a left-and-right pair of crawler type traveling devices 11 and a power transmission mechanism 12 (see FIG. 2). The traveling part 2 causes the combine harvester 1 to travel in a forward-and-backward direction or to turn to a left-and-right direction by rotating the crawler of the crawler type traveling device 11 using power (e.g., rotation power) transmitted from an engine 26 of the power unit 8. The power transmission mechanism 12 is constituted of a transmission or the like to transmit power (rotation power) of the power unit 8 to the crawler type traveling device 11, and also capable of making a speed change of a rotational power speed.

The reaping part 3 is installed in front of the traveling part 2 and performs a reaping work of crop rows within a maximum number of rows to be reaped, and a width to be reaped depends on the number of rows to be reaped. The reaping part 3 includes divider 13, raising device 14, cutter 15, and conveyor 16. The divider 13 divides grain culms in the field for every row and guides a predetermined number of grain culms within the maximum number of rows to be reaped to the raising device 14. The raising device 14 raises up the grain culms guided by the divider 13. The cutter 15 cuts off the grain culms raised up by the raising device 14. The conveyor 16 conveys the grain culms cut off by the cutter 15 to the threshing part 4.

The threshing part 4 is installed in the rear of the reaping part 3. The threshing part 4 is equipped with feed chain 18 and threshing cylinder 19. The feed chain 18 conveys the grain culms conveyed from the conveyor 16 of the reaping part 3 for threshing it, and further conveys the threshed culms, i.e., waste straws, to the waste straw treating part 7. The threshing cylinder 19 threshes the grain culms conveyed by the feed chain 18.

The sorting part 5 is installed below the threshing part 4. The sorting part 5 is equipped with shaking separator 21, wind sorting device 22, grain conveying device (not shown), and waste straw discharge device (not shown). The shaking separator 21 sifts the threshed grains which fall from the threshing part 4 to sort it into grains and waste straws, etc. The wind sorting device 22 further sorts the threshed grains sorted by the shaking separator 21 into grains and waste straws, etc. by air blow. The grain conveying device conveys the grains sorted by the shaking separator 21 and the wind sorting device 22 to the storage part 6. The waste straw discharge device discharges the waste straws, etc. sorted by the shaking separator 21 and the wind sorting device 22 to the outside of the vehicle.

The storage part 6 is installed on the right side of the threshing part 4. The storage part 6 is equipped with grain tank 23 and discharge device 24. The grain tank 23 stores the grains conveyed from the sorting part 5. The discharge device 24 is constituted of an auger or the like and performs a discharging work of the grains, which is to discharge the grains stored in the grain tank 23 to any place. The discharge device 24 performs a discharge operation automatically under the control by a controller 50 (see FIG. 2) or manually according to an operation of the steering part 9.

The waste straw treating part 7 is installed behind the threshing part 4. The waste straw treating part 7 is equipped with waste straw conveying device (not shown) and waste straw cutting device (not shown). For example, the waste straw treating part 7 discharges the waste straws conveyed from the feed chain 18 of the threshing part 4 to the outside of the vehicle (e.g., behind or below the combine harvester 1) by means of the waste straw conveying device as it is. Alternatively, the waste straw treating part 7 conveys the waste straws to the waste straw cutting device by the waste straw conveying device and discharges it outside the vehicle (e.g., behind the combine harvester 1) after it is cut by the waste straw cutting device.

The power unit 8 is installed above the traveling part 2 and in front of the storage part 6. The power unit 8 is equipped with the engine 26 to generate rotation power. The power unit 8 transmits rotation power generated by the engine 26 to traveling part 2, reaping part 3, threshing part 4, sorting part 5, storage part 6, and waste straw treating part 7. Furthermore, the combine harvester 1 is equipped with a fuel tank (not shown) to store fuel to be supplied to the engine 26 of the power unit 8.

Figure 3:
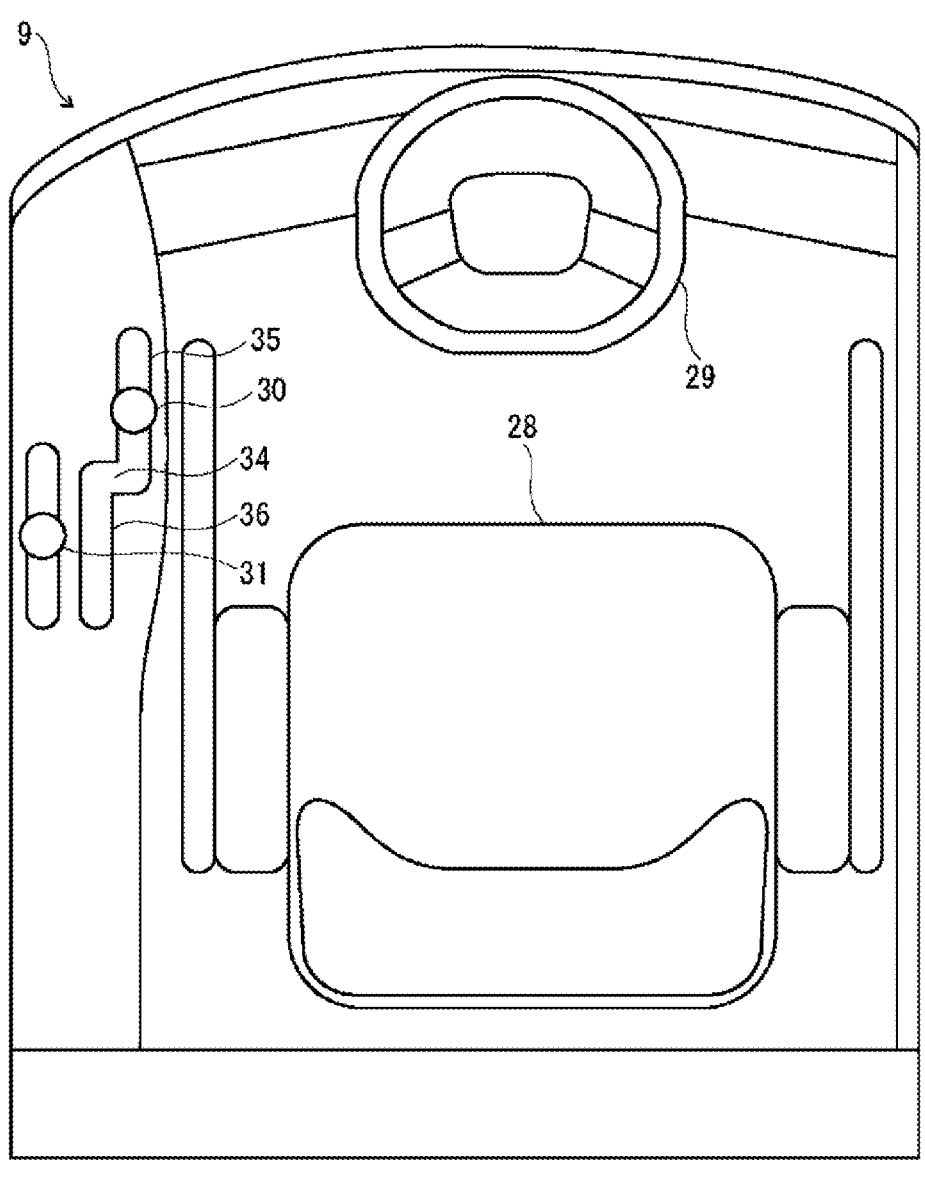
FIG. 3 is a plan view of a steering part of the combine harvester according to an embodiment of a work vehicle of the present invention.

The steering part 9 is installed above the power unit 8. As shown in FIG. 3, the steering part 9 is equipped with operation tools for steering the combine harvester 1, which are located around the operator's seat 28 on which an operator sits. The steering part 9 includes as the operation tools a steering wheel 29 which is a turning operation tool to instruct the vehicle of the combine harvester 1 to turn, a main gearshift lever 30 and a sub gearshift lever 31 which is a speed changing tool to instruct the combine harvester 1 to make a speed change in forward and backward travel, and the like. The manual travel of the combine harvester 1 is performed by the traveling part 2 (power transmission mechanism 12) which accepts operations of the steering wheel 29 of the steering part 9 as well as the main gearshift lever 30 and the sub gearshift lever 31.

The steering part 9 includes a mechanism to operate reaping work by the reaping part 3, threshing work by the threshing part 4, discharging work by the discharge device 24 of the storage part 6, and the like. In addition, the steering part 9 includes a display unit 33 such as a monitor to display various information and output it to the operator (see FIG. 2).

The steering wheel 29 transmits turning operation by the operator to the power transmission mechanism 12 of the traveling part 2 to change a traveling instruction of the combine harvester 1, that is, it operates the combine harvester 1 to turn. The steering wheel 29 has a margin of about ±5 degrees along a rotation direction of it and is configured so that any operation within this margin is not transmitted to the traveling part 2. The margin of the steering wheel 29 is not limited to ±5 degrees and can be adjusted manually.

For example, while the manual travel of the combine harvester 1 is being performed, the traveling part 2 (power transmission mechanism 12) always accepts turning operation of the steering wheel 29 by the operator. On the other hand, when the steering wheel 29 is operated while autonomous forward travel of the combine harvester 1 is being performed, the traveling part 2 switches the autonomous travel to the manual travel without stopping the combine harvester 1. Furthermore, when the steering wheel 29 is operated while autonomous backward travel of the combine harvester 1 is being performed, the traveling part 2 switches the autonomous travel to a manual travel with limitation without stopping the combine harvester 1 as described later. In other words, when operation of the steering wheel 29 exceeds the above mentioned margin during the autonomous travel, the traveling part 2 can cause the vehicle to turn according to turning operation of the steering wheel 29 without stopping the vehicle.

The main gearshift lever 30 and the sub gearshift lever 31 transmit speed change operation by the operator to the power transmission mechanism 12 of the traveling part 2 to switch a set traveling speed of the combine harvester 1. For example, in the case where a manual travel mode is set, if the main gearshift lever 30 is in the center neutral position 34, the combine harvester 1 would be forced to stop. When the main gearshift lever 30 is tilted to a forward travel speed change area 35 being a front side of the neutral position 34, forward traveling operation of the combine harvester 1 is transmitted to the traveling part 2, and a set speed for forward travel, which depends on a position in the forward-and-backward position of the main gearshift lever 30 in the forward travel speed change area 35 extending in the forward-and-backward direction, is set to the traveling part 2. When the main gearshift lever 30 located in the forward travel speed change area 35 is tilted from the neutral position side to a front side, a set speed for the forward travel is increased. On the other hand, when it is tilted from the front side to the neutral position side, the set speed for the forward travel is decreased.

On the other hand, when the main gearshift lever 30 is tilted to a backward travel speed change area 36 being a rear side of the neutral position 34, backward traveling operation of the combine harvester 1 is transmitted to the traveling part 2, and a set speed for backward travel, which depends on a position in the forward-and-backward position of the main gearshift lever 30 in the backward travel speed change area 36 extending in the forward-and-backward direction, is set to the traveling part 2. When the main gearshift lever 30 located in the backward travel speed change area 36 is tilted from the neutral position side to a rear side, a set speed for the backward travel is increased. On the other hand, when it is tilted from the rear side to the neutral position side, the set speed for the backward travel is decreased.

When the autonomous travel mode is set to perform autonomous travel of the combine harvester 1, the main gearshift lever 30 is positioned in the forward travel speed change area 35. When the autonomous travel mode is set, it may be one of the conditions for starting autonomous travel of the combine harvester 1 that the main gearshift lever 30 is positioned in the forward travel speed change area 35. In autonomous forward travel, a vehicle speed is set within the range between 0% and 100% by using a mobile terminal 53 or the like, and a set speed for forward travel, which is based on both a speed set value according to a position in the forward-and-backward direction of the main gearshift lever 30 in the forward travel speed change area 35 and the above mentioned set vehicle speed, is set to the traveling part 2. For example, when the main gearshift lever 30 is tilted to the front side from the neutral side during autonomous travel, the set speed for forward travel is decreased. For example, in the case where the set vehicle speed is 50% and the speed set value is 2 m/s, the set speed for forward travel is set to 1 m/s. Also, in autonomous backward travel, the vehicle speed is set within the range between 0% and 100% by using the mobile terminal 53 or the like, and a set speed for backward travel, which is based on both a speed set value according to a position in the forward-and-backward direction of the main gearshift lever 30 in the forward travel speed change area 35 and the above mentioned set vehicle speed, is set to the traveling part 2.

The sub gearshift lever 31 switches a rotational power speed, which is transmitted from the power transmission mechanism 12 to the traveling part 2, to at least either low or high speed. For example, the sub gearshift lever 31 is switched to a low speed position when the combine harvester 1 is in a work state where it is traveling with reaping operation, while it is switched to a high speed position when the combine harvester 1 is in a traveling state where the combine harvester 1 is traveling without reaping operation. In the autonomous travel mode, the sub gearshift lever 31 may be automatically switched to low or high speed position according to an operating state of the reaping part 3.

As shown in FIG. 2, the combine harvester 1 includes a positioning unit 38 which uses a satellite positioning system such as GPS or the like to obtain position information on the combine harvester 1. The positioning unit 38 receives a positioning signal from a positioning satellite via a positioning antenna and obtains position information of the positioning unit 38, that is, position information of the combine harvester 1 based on the positioning signal.

The combine harvester 1 may be configured to be able to communicate with a base station (not shown) located in a ridgeway or the like around the field. The base station receives a positioning signal from the positioning satellite via the positioning antenna and obtains position information of the base station based on the positioning signal. The base station transmits correction information based on position information of the base station to the combine harvester 1 (e.g., positioning unit 38). The combine harvester 1 (e.g., positioning unit 38) receives correction information from the base station, and corrects position information of the positioning unit 38, that is, the combine harvester 1 based on correction information.

Next, a controller 50 of the combine harvester 1 is described with reference to FIG. 2. The controller 50 is composed of a computer such as a CPU and is connected to memory units 51 such as ROM, RAM, hard disk drive, flash memory, etc. and a communication unit 52 which communicates with external devices. The memory unit 51 stores programs and data for controlling various components and functions of the combine harvester 1. The controller 50 performs arithmetic operations based on programs and data stored in the memory unit 51, thereby controlling the various components and functions of the combine harvester 1. The controller 50 controls the positioning unit 38 to obtain the position information of the combine harvester 1, for example.

The memory unit 51 stores the field information about a field to be worked on by the combine harvester 1, for example. The field information includes shape, size, and position information (coordinates, etc.) of field edges which constitute the perimeter of the field, as well as shape, size, and location information (coordinates, etc.) of the unreaped area of the field.

The communication unit 52 allows external devices such as a mobile terminal 53 owned by the operator to wirelessly communicate with it via a wireless communication antenna. The controller 50 controls the communication unit 52 to wirelessly communicate with the mobile terminal 53 in order to transceive various information with the mobile terminal 53.

The mobile terminal 53 is one of the components of the combine harvester 1 and can remotely control the combine harvester 1. For example, it is constituted of a tablet terminal equipped with a touch panel, a laptop personal computer, or the like. The mobile terminal 53 is equipped with display unit 54 such as a touch panel and a monitor for displaying various information and outputting it to the operator, and input part such as a touch panel and operation keys for accepting input operations of various information from the operator. The steering part 9 may be equipped with an operation device similar to the mobile terminal 53. For example, the mobile terminal 53 displays on the display unit 54 a screen (e.g., home screen or mode setting screen) on which any of the manual travel mode and the autonomous travel mode of the combine harvester 1 can be set, and transmits to the combine harvester 1 the travel mode set according to the operator's operation.

The mobile terminal 53 is configured to accept via the input part an input operation associating with field information about the field to be worked on. For example, it displays a field information setting screen on which field information can be set. On the field information setting screen, the mobile terminal 53 may display the traveling route of the combine harvester 1 on a field map so that a traveling direction of it can be seen, while displaying the field map based on the field information. The mobile terminal 53 transmits the field information set on the field information setting screen to the combine harvester 1.

The mobile terminal 53 has a function to accept a selection of a traveling pattern of the autonomous reaping travel of the combine harvester 1, and when creating a travel route of the autonomous reaping travel, it displays on the display unit 54 a screen (e.g., traveling selection screen) for selecting the traveling pattern of the reciprocating reaping or the whirl reaping. The mobile terminal 53 transmits the traveling pattern (the reciprocating reaping or the whirl reaping) input according to the operator's operation to the combine harvester 1 to instruct it to create the travel route. The mobile terminal 53 may set in advance the set vehicle speed within the range between 0 and 100% and associate it with the travel route.

Figure 4:
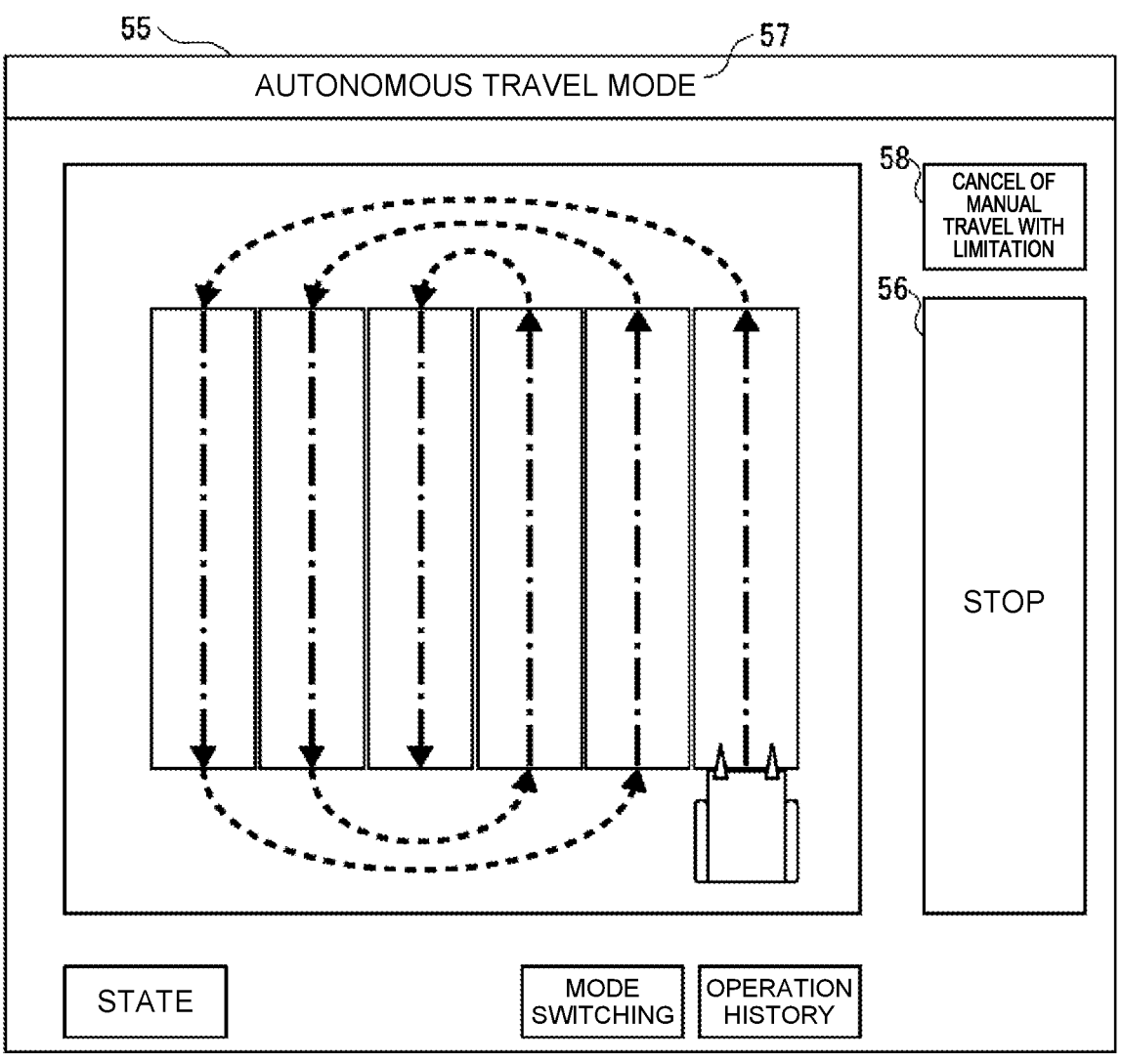
FIG. 4 is a plan view illustrating an example of a work screen displayed on a mobile terminal in the combine harvester according to an embodiment of a work vehicle of the present invention.

When the autonomous reaping travel is performed in the combine harvester 1, the mobile terminal 53 displays on the display unit 54 a work screen 55 of the autonomous reaping travel as shown in FIG. 4. The work screen 55 operatably displays a stop button 56 which operates temporary stop of the vehicle and the like, for example. In addition, the work screen 55 identifiably displays the current position of the combine harvester 1 along with the field to be subjected to the autonomous reaping travel and the travel route. The work screen 55 identifiably displays the set travel mode in a title column 57, and it displays not only the autonomous travel mode but also a switched travel mode which has been automatically switched according to a work state. Preferably the set vehicle speed can be set within the range between 0 and 100% on the work screen 55 of the mobile terminal 53.

In addition, by executing the program stored in the memory unit 51, the controller 50 operates as a field information setting unit 60, a travel route creation unit 61, an autonomous travel controller 62, and an autonomous reaping controller 63. The travel route creation unit 61, the autonomous travel controller 62, and the autonomous reaping controller 63 realize, in an autonomous operation method of the present invention, a travel route creation step, an autonomous travel control step, and an autonomous reaping control step, respectively. The traveling part 2 (power transmission mechanism 12) functions as a turning instruction part which instructs the combine harvester 1 to turn according to the turning operation of the steering wheel 29, and realizes a turning instruction step in the autonomous operation method of the present invention.

The field information about the field to be worked on is set in the field information setting unit 60 automatically or manually and stored in the memory unit 51. For example, the field information is set in the field information setting unit 60 manually according to an input operation of the field information to the field information setting screen of the mobile terminal 53. Alternatively, the field information setting unit 60 may receive field information stored by a server (not shown) through communication with the server and automatically set it as the field information. In the field information setting unit 60, the field information received from the server may be edited via the field information setting screen of the mobile terminal 53.

In another example, the field information setting unit 60 may acquire field images of the field to be worked on and set the field information based on the results of image analysis of the field images. In addition, the field information setting unit 60 may acquire more accurate field information by taking a consistency among the field information set according to the operation of the mobile terminal 53, the field information received from the server, and the field information analyzed from the field images.

The field images may be captured by a vehicle camera which is built in the combine harvester 1, or the communication unit 52 may receive the images captured by a mobile camera which is built in the mobile terminal 53 or the images captured by an aerial camera which is built in an aerial photography device such as a drone or the like. The field information setting unit 60 may analyze the field information from the field images of one camera or two or more cameras selected from among the vehicle camera, the mobile camera, and the aerial camera. The controller 50 may cause the display unit 33 of the steering part 9 to display the field images captured by the vehicle camera, the mobile camera, or the aerial camera, or cause the display unit 54 of the mobile terminal 53 to display the field images transmitted to the mobile terminal 53.

The travel route creation unit 61 creates a travel route which is referred to by the combine harvester 1 for performing the autonomous travel and the autonomous reaping (autonomous reaping travel) in the field and stores it in the memory unit 51. The travel route includes not only a travel setting associating with autonomous travel but also a work setting associating with a work such as autonomous reaping. In addition to the traveling position in the field, the travel setting includes a traveling direction (steering direction and forward or backward) and a set vehicle speed at each traveling position. The work setting includes information about operation or stoppage of reaping work, reaping speed and reaping height, the number of rows to be reaped, and other work at each traveling position.

The travel route creation unit 61 sets a work route for reaping while traveling in the forward direction to an unreaped area in the field in a linear manner, and sets a travel route by combining a plurality of work routes. In addition, the travel route creation unit 61 sets an idling-turn travel route on a headland between two consecutive work routes. Namely, the travel route creation unit 61 creates a travel route consisting of a plurality of work routes and idling travel routes between the plurality of work routes. Other than work routes and idling travel routes, the travel route creation unit 61 may also create a travel route by setting movement paths to be traveled in a straight manner in the forward or backward direction or movement paths to be traveled while turning in order to move in a reaped area of the field.

The travel route creation unit 61 creates a travel route according to the traveling pattern (reciprocating reaping or whirl reaping) selected in accordance with operation of the mobile terminal 53 or the like. For example, the travel route creation unit 61 creates a travel route of a whirl reaping in which a circumferential operation of the work route along an inner circumference of an unreaped area is repeated while the circumference is shifted toward a center, or a travel route of a reciprocating reaping in which a plurality of work routes are reciprocated in the unreaped area. The travel route creation unit 61 sets a start position where the autonomous reaping travel is started and an end position where the autonomous reaping travel is completed in the travel route.

When the autonomous travel mode is set, the autonomous travel controller 62 controls the power unit 8 and the traveling part 2 based on the travel setting of the travel route created by the travel route creation unit 61 to cause them to perform autonomous travel according to the travel route. The combine harvester 1 is equipped with gyro sensor and orientation sensor to obtain displacement information and orientation information of the combine harvester 1, and the autonomous travel controller 62 may adjust autonomous travel of the combine harvester 1 based on the displacement information and the orientation information.

Furthermore, the autonomous travel controller 62 sets the forward or backward set speed as the set speed for autonomous travel based on the speed set value and set vehicle speed according to the forward/backward position of the main gearshift lever 30, while if the main gearshift lever 30 is operated during autonomous forward travel, the set speed of autonomous travel is changed according to the position of the main gearshift lever 30. For example, during autonomous forward travel, when the main gearshift lever 30 being positioned in the forward travel speed change area 35 is tilted from the neutral side to forward, the autonomous travel controller 62 increases forward set speed according to a position of the main gearshift lever 30. On the other hand, when the main gearshift lever is tilted from a front side to the neutral side, the forward travel set speed is decreased according to a forward-and-backward position of the main gearshift lever 30.

When the steering wheel 29 is operated during autonomous forward travel, the autonomous travel controller 62 finishes the autonomous forward travel of the combine harvester 1 without stopping travel of it, and the combine harvester 1 continues traveling and transits to manual forward travel while maintaining the traveling state (direction of travel and set speed, etc.) based on operations of the steering wheel 29, the main gearshift lever 30 and the like during the time when the autonomous forward traveling is finished. The manual travel is performed in the traveling part 2 according to operations of the steering wheel 29 and the main gearshift lever 30. Furthermore, a travel mode of the combine harvester 1 is switched from an autonomous travel mode to a manual travel mode.

Furthermore, when the steering wheel 29 is operated while autonomous backward travel of the combine harvester 1 is being performed, the autonomous travel controller 62 finishes the autonomous backward travel of it without stopping the combine harvester 1 and causes it to transit to a manual travel with limitation. The manual travel with limitation is performed in the traveling part 2 according to operations of the steering wheel 29 and the main gearshift lever 30. Furthermore, a travel mode of the combine harvester 1 is switched from an autonomous travel mode to a manual travel with limitation mode. Through manual travel with limitation, the traveling part 2 performs speed change operation and switching operation of forward/backward travel of the combine harvester 1 according to a preset control pattern, while performing turning operation of the combine harvester 1 according to turning operation of the steering wheel 29.

By the way, since the autonomous backward travel is performed with the main gearshift lever 30 being in the forward travel speed change area 35, when the autonomous backward travel is finished and transited to manual travel as it is, the backward travel speed at the time when the autonomous backward travel is finished does not match a forward travel set speed set based on a position of the main gearshift lever 30. At this time, if the forward travel set speed is set directly to the combine harvester 1 which has been performing autonomous backward travel, since an acceleration at immediately switching from backward travel speed to forward travel speed is steep as well as switching from backward travel to forward travel is sudden, the operator may feel discomfort and be subjected to danger in traveling. Similarly, when the forward travel set speed is set directly to the combine harvester 1 which is performing backward travel in normal manual travel, an acceleration at immediately switching from the backward travel speed to the forward travel speed is also steep.

Therefore, through manual travel with limitation, after the autonomous travel controller 62 finishes autonomous backward travel according to the operation of the steering wheel 29, the traveling part 2 decelerates from a traveling state where the autonomous backward travel is finished, then performs manual forward travel when the backward travel speed reaches zero, accelerates gently until the forward travel speed reaches the forward travel set speed set based on the position of the main gearshift lever 30, and is completely switched to manual forward travel when the forward travel speed reaches the forward travel set speed. In this way, through manual travel with limitation, an acceleration is set more gently than an acceleration in the case where the forward travel set speed is directly set to the combine harvester 1 which is performing a backward travel in normal manual travel in the manual travel mode so that the traveling speed of the combine harvester 1 is gradually shifted from the backward travel speed to the forward travel speed, thereby reducing discomfort for the operator in the operation and suppressing danger in traveling.

When performing manual travel with limitation, the travel mode of the combine harvester 1 is switched from a manual travel with limitation mode to the manual travel mode when the forward travel speed reaches a forward travel set speed after performing manual forward travel through manual travel with limitation. The combine harvester 1 preferably controls the manual travel with limitation so as to reach the forward travel set speed within a predetermined adjustment travel time duration (e.g., 20 seconds) after starting the manual travel with limitation.

When the autonomous travel mode is set, the autonomous reaping controller 63 controls the power unit 8 and the reaping part 3 based on the work setting of the travel route created by the travel route creation unit 61 to cause them to perform autonomous reaping according to the travel route. The autonomous reaping controller 63 allows the reaping part 3 to automatically reap unreaped grain culms on the travel route. Associating with the autonomous reaping, the autonomous reaping controller 63 controls threshing part 4, sorting part 5, storage part 6, and waste straw treating part 7 to cause them to perform threshing of grain culms after reaping, sorting of grains and waste straws after threshing, storing of grains after sorting, and treating of waste straws after threshing, respectively.

Figure 5:
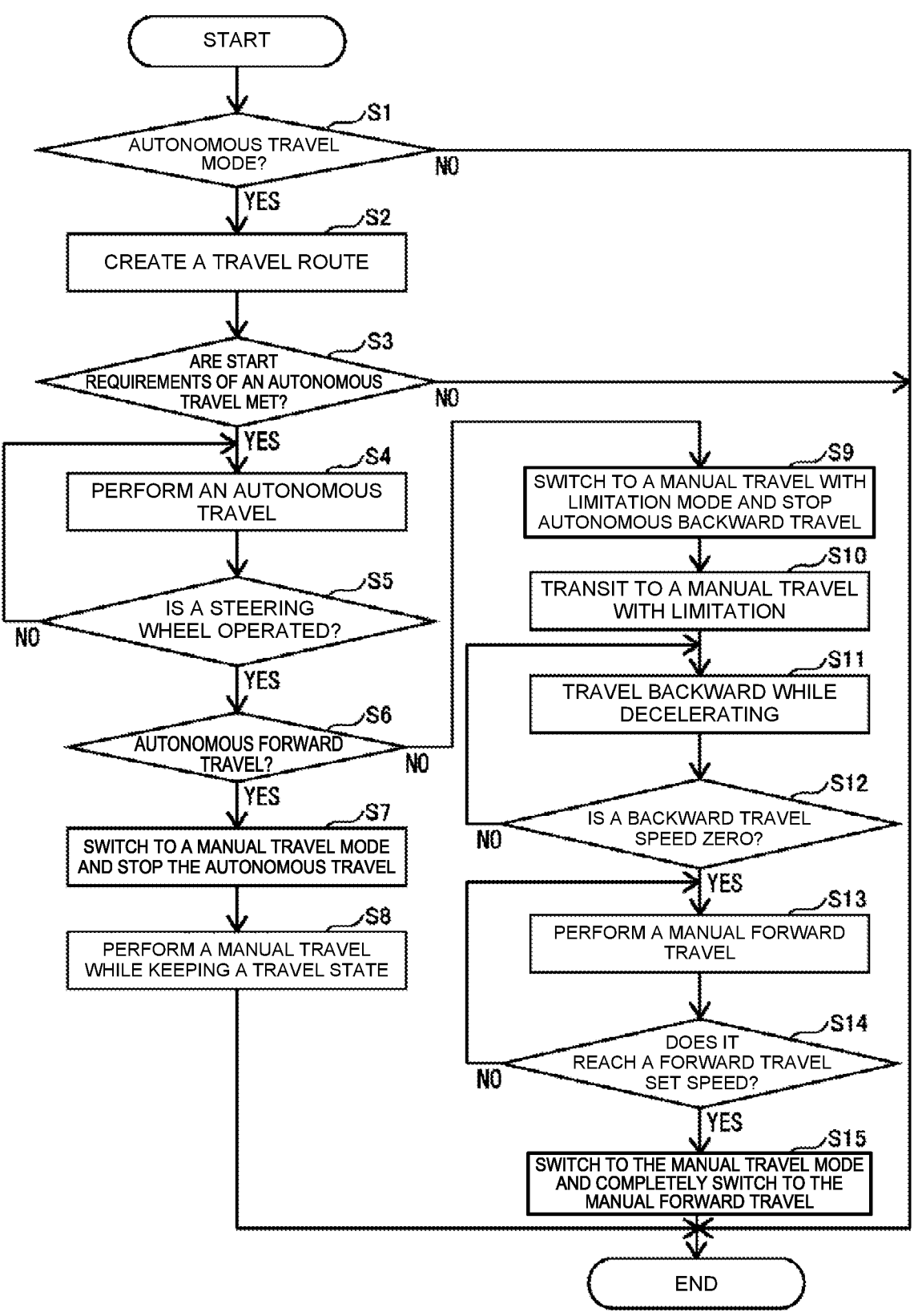
FIG. 5 is a flowchart illustrating exemplarily traveling operation of the combine harvester according to an embodiment of a work vehicle of the present invention.

An example of travel operation of the combine harvester 1 according to the present embodiment is described with reference to a flowchart depicted in FIG. 5. Although the reaping operation of the combine harvester 1 is performed as necessary in an unreaped area of the field, description thereof is omitted below.

If the autonomous travel mode is set to the combine harvester 1 (Step S1: Yes), first, the travel route creation unit 61 creates a travel route for performing autonomous travel in the field to be worked on and stores it in the memory unit 51 (Step S2). Next, if the combine harvester 1 meets various autonomous travel start conditions (step S3: Yes), the autonomous travel controller 62 controls the power unit 8 and the traveling part 2 based on travel settings of the created travel route to start the autonomous travel (step S4). If the autonomous travel mode is not set (step S1: No) or if the autonomous travel start conditions are not met (step S3: No), the autonomous travel is not started.

When the operator operates the steering wheel 29 during the autonomous travel (step S5: Yes), if the autonomous travel controller 62 causes the combine harvester 1 to perform autonomous forward travel (step S6: Yes), a travel mode of the combine harvester 1 is switched from an autonomous travel mode to a manual travel mode, and the autonomous travel controller 62 finishes autonomous forward travel based on the travel settings (step S7), and the traveling part 2 continues traveling while maintaining a traveling state at the time when the autonomous forward travel is finished and is transited to manual travel (step S8).

Figure 6:
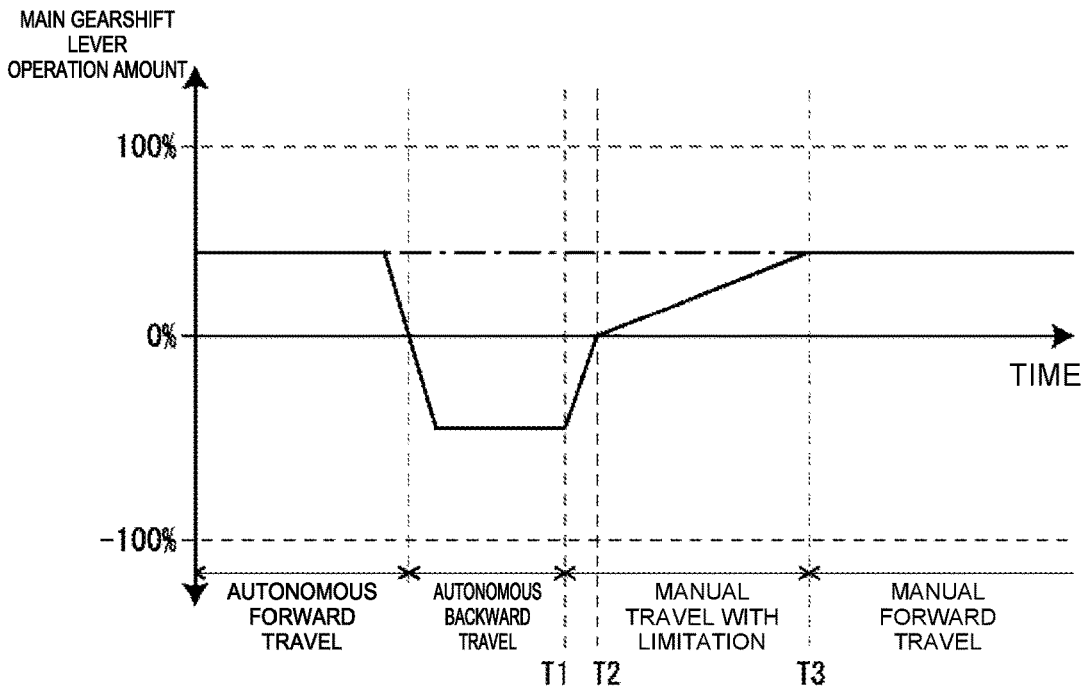
FIG. 6 is a graph illustrating speed change in exemplarily traveling operation of the combine harvester according to an embodiment of a work vehicle of the present invention.

On the other hand, when the operator operates the steering wheel 29 during the autonomous travel (step S5: Yes), if the autonomous travel controller 62 causes the combine harvester 1 to perform autonomous backward travel (step S6: No), the travel mode of the combine harvester 1 is switched from the autonomous travel mode to a manual travel with limitation mode, and the autonomous travel controller 62 finishes the autonomous backward travel based on the travel settings (step S9). For example, FIG. 6 shows an example in which after the combine harvester 1 is switched from the autonomous forward travel to the autonomous backward travel, the operator performs operation of the steering wheel 29 at time T1 during performing the autonomous backward travel. In FIG. 6, the travel mode is switched to the manual travel with limitation mode at time T1. In FIG. 6, a set speed according to the position of the main gearshift lever 30 is shown as a one-dot chain line, and an actual speed of the combine harvester 1 is shown as a solid line. In FIG. 6, an ordinate axis shows a time and a abscissa axis shows the amount of operation of the main gearshift lever 30. In particular, regarding the amount of operation of the main gearshift lever 30, 0% stands for the neutral position 34 of the main gearshift lever 30, 0% to 100% stands for the position of the main gearshift lever 30 in the forward travel speed change area 35 (i.e., the speed setting value) during the autonomous forward travel, and −100% to 0% stands for the position of the main gearshift lever 30 in the forward travel speed change area 35 (i.e., the speed setting value) during the autonomous backward travel.

The traveling part 2 transits to manual travel with limitation (step S10), and decelerates from a traveling state at the time when the autonomous backward travel is finished (step S11). In FIG. 6, the operation transits to the manual travel with limitation from time T1. Furthermore, if the backward travel speed reaches zero (step S12: Yes), manual forward travel is performed in the traveling part 2 (step S13). In FIG. 6, the backward travel speed reaches zero at time T2, and the operation is switched to the manual forward travel. Furthermore, the traveling part 2 gradually accelerates the forward travel speed of the manual forward travel, and if the forward travel speed reaches the forward travel set speed set based on the position of the main gearshift lever 30 (step S14: Yes), the combine harvester 1 finishes the manual travel with limitation, the travel mode is switched from the manual travel with limitation mode to manual travel mode, and the combine harvester 1 is completely switched to the manual forward travel (step S15). In FIG. 6, the forward travel speed reaches the forward travel set speed at time T3, and the travel mode is switched to the manual travel mode, and the combine harvester 1 is completely switched to the manual forward travel.

As described above, according to this embodiment, the combine harvester 1, which is an example of a work vehicle, is a work vehicle capable of switching between a manual travel mode to travel based on operation of an operation tool including a steering wheel 29 which is a turning operation tool and an autonomous traveling mode to travel based on a predetermined travel route, which includes a controller 50 to function as an autonomous travel controller 62 to control travel of the combine harvester 1 through the autonomous travel mode based on the travel route. The combine harvester 1 is switched from the autonomous travel mode to the manual travel mode without stopping the vehicle when the steering wheel 29 is operated during the autonomous travel mode.

This allows the combine harvester 1 to be switched to the manual travel with a simple operation of operating the steering wheel 29 when performing autonomous travel, and the turning operation of the steering wheel 29 can be applied, so that it is possible to correct a trajectory as the operator desires, thereby improving operability. In addition, even in case of correcting the trajectory during autonomous travel, it is not necessary to suspend or finish the autonomous travel, thereby improving work efficiency.

According to this embodiment, the autonomous travel controller 62 and the traveling part 2 of the combine harvester 1 may apply to travel of the combine harvester 1 different kinds of control according to a travel direction of the combine harvester 1 at a time when the steering wheel 29 is operated during the autonomous travel mode.

This allows the combine harvester 1 to travel under the control corresponding to a direction of travel when switched from the autonomous travel to the manual travel.

According to this embodiment, the autonomous travel controller 62 causes the combine harvester 1 to perform the autonomous travel mode when the main gearshift lever 30 which is a speed changing tool to instruct a forward-and-backward speed change of the combine harvester 1 is positioned in a forward travel speed change area 35. Furthermore, the combine harvester 1 is switched to the manual travel mode and performs manual forward travel based on the position of the main gearshift lever 30 in the forward travel speed change area 35, when the steering wheel 29 is operated during autonomous forward travel through the autonomous travel mode. On the other hand, the control according to a travel direction is switched to a manual travel with limitation mode and performs manual travel with limitation toward the forward travel direction with an acceleration more gently than an acceleration in the case where a forward travel set speed is directly set to the combine harvester 1 that is performing backward travel through the manual travel mode, based on operation of the steering wheel 29 and the position of the main gearshift lever 30 in the forward travel speed change area 35, when the steering wheel 29 is operated during autonomous backward travel through the autonomous travel mode.

As a result, even if turning operation of the steering wheel 29 is performed during the autonomous backward travel, the combine harvester 1 is gradually switched from a backward travel speed to a forward set speed with a gentle acceleration, thereby reducing discomfort for the operator in operation and suppressing danger in traveling.

In the above mentioned embodiment, an example, in which the traveling part 2 of the combine harvester 1 controls the travel speed so that the forward travel speed of manual forward travel becomes the forward travel set speed set based on the position of the main gearshift lever 30 through manual travel with limitation, is described. However, the forward travel set speed may be changed by the operator operating the main gearshift lever 30 during the manual travel with limitation.

Figure 7:
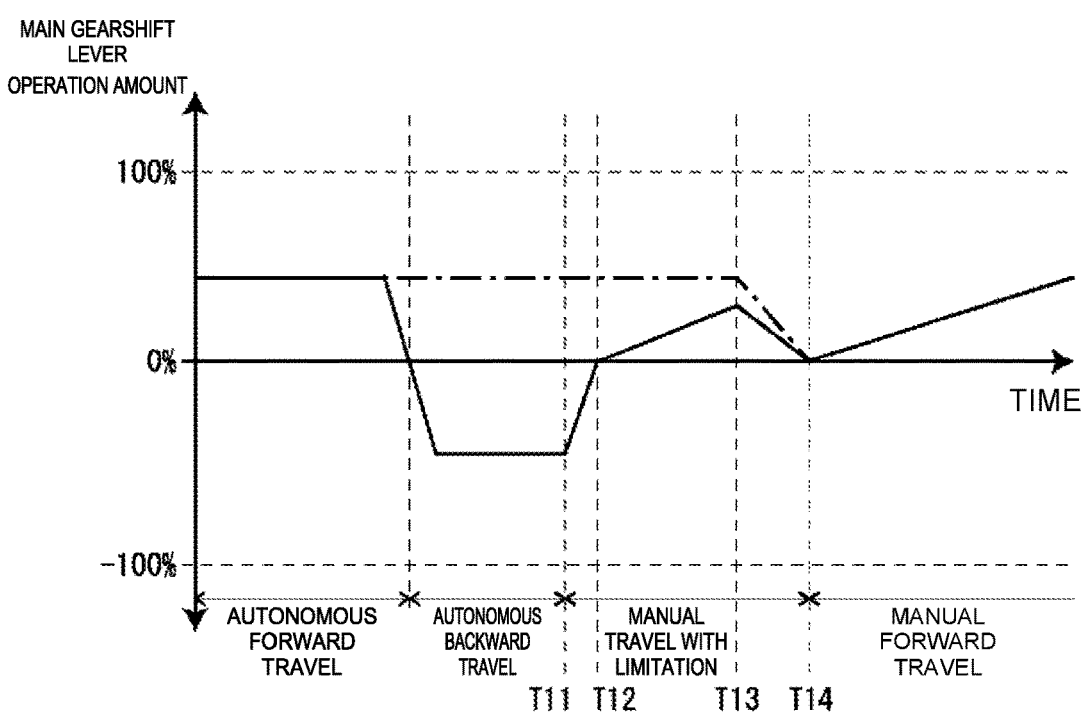
FIG. 7 is a graph illustrating another example of speed change in exemplarily traveling operation of the combine harvester according to an embodiment of a work vehicle of the present invention.

For example, in FIG. 7, after autonomous travel is started, the steering wheel 29 is operated at time T11 during autonomous backward travel. The combine harvester 1 decelerates from a traveling state at the time when the autonomous backward travel is finished, the backward travel speed of it becomes zero at time T12, then it is switched to manual forward travel. This manual forward travel targets the forward travel set speed set based on the position of the main gearshift lever 30 and is controlled so that the travel speed reaches the forward travel set speed at time T14 after the lapse of a predetermined adjustment travel time (e.g., 20 seconds), so that the main gearshift lever 30 is operated at time T13 to lower the forward travel set speed.

Therefore, when the main gearshift lever 30 is operated through manual travel with limitation, the combine harvester 1 performs acceleration and deceleration by linking it to the position of the main gearshift lever 30. For example, if the forward travel set speed is increased, the acceleration is increased, and if the forward travel set speed is decreased, the acceleration is decreased. However, as shown in FIG. 7, if the forward travel set speed is decreased to a lower speed than the actual speed, the combine harvester 1 decelerates so as to reach the forward travel set speed at time T14. For example, by setting a deceleration filter so as to reach 100% after the lapse of the adjustment travel time, the travel speed of the combine harvester 1 is controlled with the target speed calculated as the amount of operation of the main gearshift lever 30 multiplied by the amount of setting of the deceleration filter.

This allows the travel speed of the combine harvester 1 to be controlled by linking it to the operation of the main gearshift lever 30 even when the main gearshift lever 30 is operated during manual travel with limitation, thereby reducing discomfort for the operator in operation.

By the way, even in both cases where the steering wheel 29 is operated during autonomous forward travel and the steering wheel 29 is operated during autonomous backward travel to perform manual travel with limitation, the manual forward travel is performed so that the travel speed becomes the forward set speed set based on the position of the main gearshift lever 30. However, compared when switching from autonomous forward travel to manual forward travel with when switching from autonomous backward travel to manual forward travel through manual travel with limitation, the former is more comfort than the latter.

Figure 8:
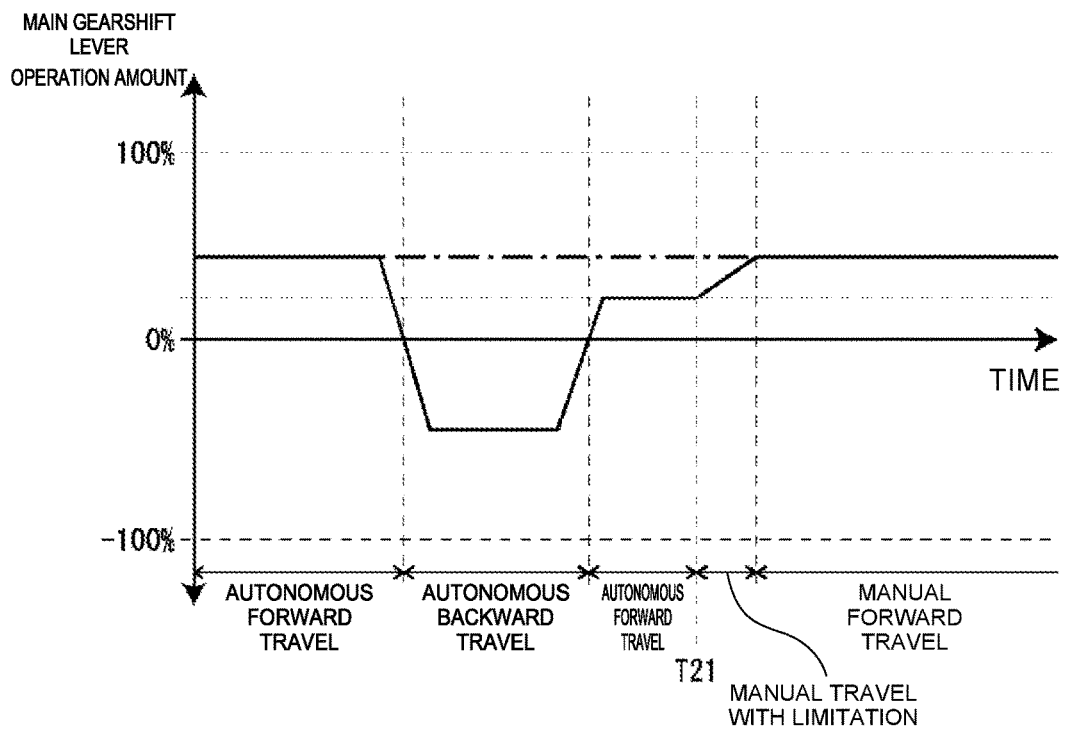
FIG. 8 is a graph illustrating another example of speed change in exemplarily traveling operation of the combine harvester according to an embodiment of a work vehicle of the present invention.

Therefore, an acceleration of the combine harvester 1 may be set so that an acceleration toward the forward set speed when switching from the autonomous forward travel to manual forward travel is steeper than an acceleration toward the forward set speed when switching from autonomous backward travel to manual forward travel through manual travel with limitation, that is, the adjustment travel time may be set shorter. For example, in FIG. 8, the forward travel speed is limited to a speed lower than the forward set speed which is set based on the position of the main gearshift lever 30 through operation of the mobile terminal 53. At this time, since the operator operates the steering wheel 29 at time T21 during autonomous forward travel, compared with when switching from autonomous backward travel to manual travel with limitation, the adjustment travel time is set shorter, and a gradient (acceleration) toward the forward set speed is made steeper.

In the above mentioned embodiment, an example, in which the traveling part 2 of the combine harvester 1 maintains manual forward travel until the forward travel speed of manual forward travel reaches the forward travel set speed set based on the position of the main gearshift lever 30 through manual travel with limitation, is described. However, the present invention is not limited to this example.

In another example, the combine harvester 1 monitors the position information of the combine harvester 1 in the field based on measurement results of the positioning unit 38, and when the combine harvester 1 is about to get out of the field, the traveling part 2 is controlled to finish the manual forward travel to stop the combine harvester 1. For example, in the case where the combine harvester 1 crosses an edge of the field through the manual forward travel as well as the combine harvester 1 progresses from the edge of the field to an area within a predetermined restriction range, it may be determined that the combine harvester 1 is about to get out of the field.

Furthermore, the combine harvester 1 is equipped with a seating sensor or the like in the operator's seat 28 of the steering part 9, and when it detects that the operator leaves the operator's seat 28, the traveling part 2 is controlled to finish the manual forward travel to stop the combine harvester 1.

Figure 9:
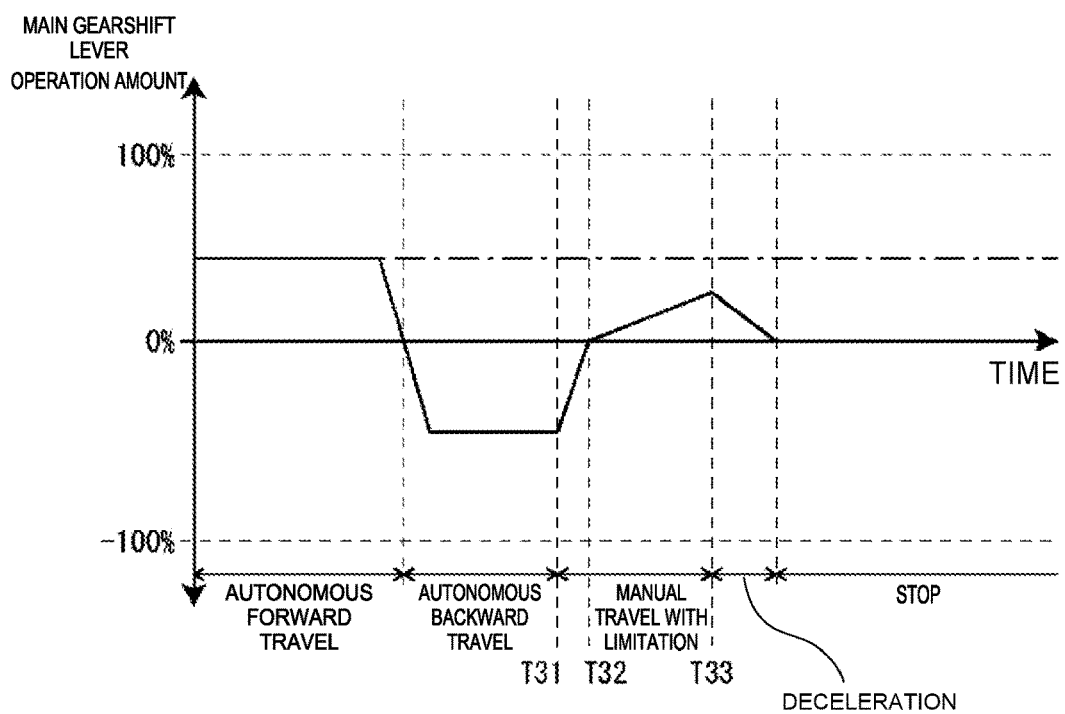
FIG. 9 is a graph illustrating another example of speed change in exemplarily traveling operation of the combine harvester according to an embodiment of a work vehicle of the present invention.

For example, in FIG. 9, after autonomous travel is started, the steering wheel 29 is operated at time T31 during autonomous backward travel. The combine harvester 1 decelerates from a traveling state at the time when the autonomous backward travel is finished, the backward travel speed of it becomes zero at time T32, then it is switched to manual forward travel. Then, when the operator leaves the operator's seat 28 at time T33, the traveling part 2 is controlled to finish the manual forward travel to stop the combine harvester 1. Preferably the traveling part 2 is gradually decelerated to finish the manual forward travel.

In the above mentioned embodiment, an example, in which the traveling part 2 of the combine harvester 1 is controlled so that when the forward travel speed of manual forward travel reaches the forward travel set speed set based on the position of the main gearshift lever 30 through manual travel with limitation, the manual travel with limitation is finished and transited to manual travel, and the travel mode of the combine harvester 1 is switched from the manual travel with limitation mode to the manual travel mode, is described. However, the present invention is not limited to this example.

In a first alternative example, the traveling part 2 of the combine harvester 1 may be controlled so that when a predetermined cancel operation is performed during the manual travel with limitation, the manual travel with limitation is switched to normal manual travel. The cancel operation is such an operation that the operator intentionally steers the combine harvester 1 to cancel the manual travel with limitation.

This allows the combine harvester 1 to be switched from manual travel with limitation to normal manual travel with the operator's intention, thereby improving operability.

Specifically, a cancellation operation unit such as a cancel button 58 (see FIG. 4) or the like to cancel the manual travel with limitation may be provided in the steering part 9 of the combine harvester 1 or the mobile terminal 53, and the traveling part 2 may recognize operation of the cancellation operation unit during the manual travel with limitation as the cancel operation. For example, the cancel button 58 may be operably displayed on the work screen 55 (see FIG. 4) of the mobile terminal 53 (see FIG. 2), or the traveling part 2 may be controlled to recognize operation of an existing tool such as the sub gearshift lever 31 during the manual travel with limitation as the cancel operation.

This allows the combine harvester 1 to be switched from manual travel with limitation to normal manual travel by accepting the operator's intention with the cancellation operation unit, thereby improving operability.

Alternatively, the traveling part 2 may recognize operation of the steering wheel 29 with an operation amount (e.g., steering angle, etc.) not less than a predetermined operation amount threshold per a predetermined unit time during the manual travel with limitation as the cancel operation.

This allows the combine harvester 1 to be switched from manual travel with limitation to normal manual travel by accepting the operator's intention in accordance with operation of the steering wheel 29, thereby improving operability.

In the above mentioned embodiment, an example, in which the traveling part 2 of the combine harvester 1 is switched to the manual travel with limitation toward the forward travel direction when the steering wheel 29 is operated during autonomous backward travel, is described. However, the present invention is not limited to this example.

In a second alternative example, when the steering wheel 29 is operated during autonomous backward travel, in place of the manual travel with limitation and regardless of the position of the main gearshift lever 30 in the forward travel speed change area 35, the traveling part 2 may continue traveling while maintaining the traveling state at the time when the autonomous backward travel is finished and is transited to manual backward travel. In this case, when the main gearshift lever 30 is operated to the neutral position 34, the state at the time when the autonomous backward travel is finished is canceled and the traveling part 2 transits to normal manual travel. Then, the manual travel is performed at a forward travel set speed or a backward travel set speed according to the position of the main gearshift lever 30.

In this case, a traveling mode of the combine harvester 1 may be switched from an autonomous travel mode to a manual travel with limitation mode when the steering wheel 29 is operated during the autonomous backward travel, and then switched from the manual travel with limitation mode to a manual travel mode when the main gearshift lever 30 is operated to the neutral position 34.

Figure 10:
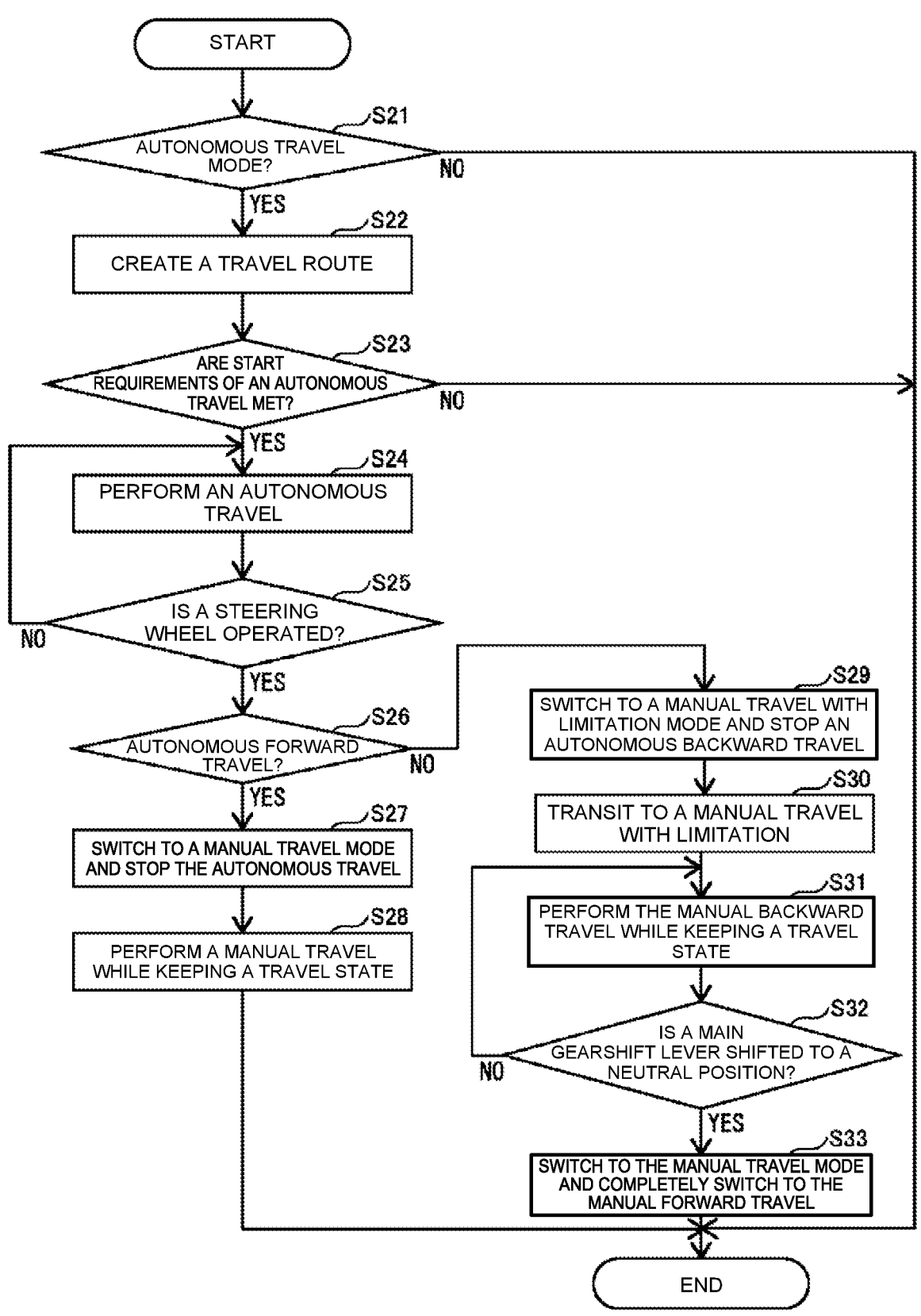
FIG. 10 is a flowchart illustrating a second alternative example of exemplarily traveling operation of the combine harvester according to an embodiment of a work vehicle of the present invention.

An example of travel operation of the combine harvester 1 according to the second alternative example is described with reference to a flowchart depicted in FIG. 10. In the second alternative example, first, operations of steps S21 through S25 of the example of travel operation shown in FIG. 10 are similar to the operations of steps S1 through S5 of the example of travel operation shown in FIG. 5, autonomous travel is performed in the combine harvester 1, and the steering wheel 29 is operated during the autonomous travel.

If the autonomous travel controller 62 performs autonomous forward travel of the combine harvester 1 (step S26: Yes), similar to the operations of steps S7 and S8 of the example of travel operation shown in FIG. 5, the autonomous travel controller 62 finishes the autonomous travel (step S27), and the traveling part 2 maintains a traveling state at the time when the autonomous travel is finished and transits to manual forward travel (step S28).

On the other hand, if the autonomous travel controller 62 performs autonomous backward travel of the combine harvester 1 (step S26: No), the travel mode of the combine harvester 1 is switched from the autonomous travel mode to a manual travel with limitation mode, and the autonomous travel controller 62 finishes the autonomous backward travel based on the travel settings (step S29).

The travel mode of the combine harvester 1 is switched from the autonomous travel mode to the manual travel with limitation mode and the combine harvester 1 is transited to the manual travel with limitation (step S30), and the traveling part 2, regardless of the position of the main gearshift lever 30 in the forward travel speed change area 35, continues manual backward travel while maintaining the traveling state at the time when the autonomous backward travel is finished (step S31). Furthermore, if the main gearshift lever 30 is operated to the neutral position 34 (step S32:Yes), the combine harvester 1 finishes the manual travel with limitation, the travel mode is switched from a manual travel with limitation to a manual travel mode, and the traveling part 2 is completely switched to manual forward travel (step S33) by canceling the traveling state at the time when the autonomous backward travel is finished.

As described above, according to the second alternative example, the autonomous travel controller 62 causes the combine harvester 1 to perform autonomous travel mode when the main gearshift lever 30 to instruct a forward-and-backward speed change of the combine harvester 1 is positioned in the forward travel speed change area 35. When the steering wheel 29 is operated during autonomous forward travel in the autonomous travel mode, the travel mode is switched to the manual travel mode, and manual forward travel is performed based on the position of the main gearshift lever 30 in the forward travel speed change area 35. On the other hand, as a control according to the direction of travel, if the steering wheel 29 is operated during the autonomous backward travel in the autonomous travel mode, regardless of the position of the main gearshift lever 30 in the forward travel speed change area 35, travel in the backward direction is maintained, that is, manual backward travel is performed.

This allows the combine harvester 1 to maintain traveling in the backward direction when the steering wheel 29 is operated during the autonomous backward travel, regardless of the position of the main gearshift lever 30, thereby improving operability. In addition, switching from backward to forward is not sudden, thereby reducing discomfort for the operator and suppressing danger in traveling.

In the above mentioned embodiment, an example, in which the travel mode of the combine harvester 1 is switched from the autonomous travel mode to the manual travel mode without stopping the vehicle when the steering wheel 29 is operated during autonomous travel, is described. However, the present invention is not limited to this example.

In a third alternative example the travel mode of the combine harvester 1 may be switched from the autonomous travel mode to the manual travel mode without stopping the vehicle when the main gearshift lever 30 is operated in the forward travel speed change area 35 during the autonomous travel.

For example, if the main gearshift lever 30 is operated in the forward travel speed change area 35 during autonomous forward travel, the autonomous travel controller 62 changes the forward travel speed while maintaining the autonomous forward travel. At this time, while the travel mode of the combine harvester 1 is maintained in the autonomous travel mode, the autonomous travel controller 62 sets to the traveling part 2 a forward travel setting speed based on a speed setting value according to the forward-and-backward position of the main gearshift lever 30 in the forward travel speed change area 35 as well as a set vehicle speed, and autonomous forward travel is performed in the traveling part 2 so as to become the set forward travel setting speed.

On the other hand, if the main gearshift lever 30 is operated in the forward travel speed change area 35 during autonomous backward travel, the autonomous travel controller 62 finishes autonomous travel based on travel settings. At this time, the travel mode of the combine harvester 1 is switched from the autonomous travel mode to the manual travel with limitation mode, and the autonomous travel controller 62 causes the traveling part 2 to perform the manual travel with limitation mentioned above.

Figure 11:
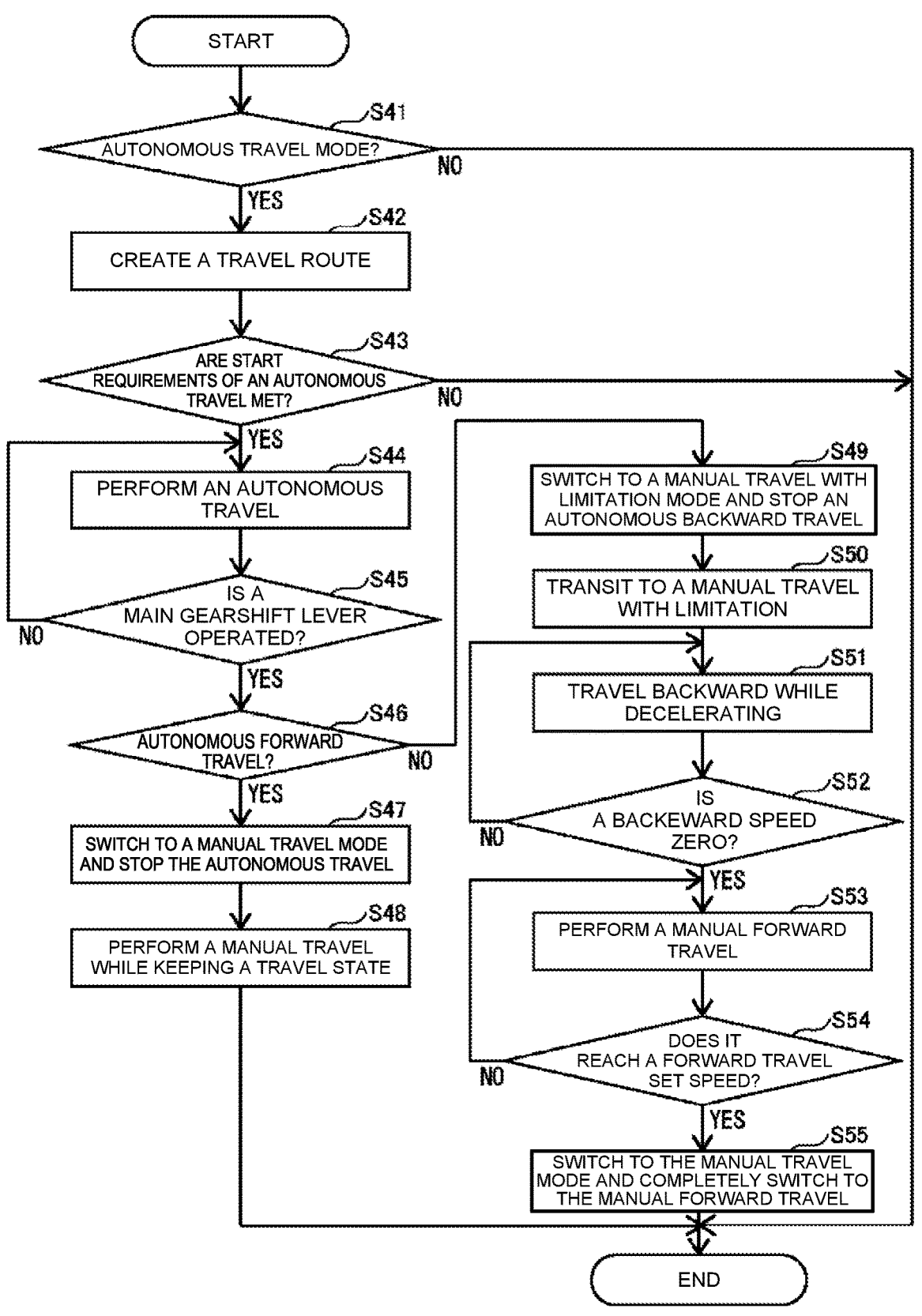
FIG. 11 is a flowchart illustrating a third alternative example of exemplarily traveling operation of the combine harvester according to an embodiment of a work vehicle of the present invention.

An example of travel operation of the combine harvester 1 according to the third alternative example is described with reference to a flowchart depicted in FIG. 11. In the third alternative example, first, operations of steps S41 through S44 of the example of travel operation shown in FIG. 11 are similar to the operations of steps S1 through S4 of the example of travel operation shown in FIG. 5, autonomous travel is performed in the combine harvester 1.

When the operator operates the main gearshift lever 30 in the forward travel speed change area 35 (step S45:Yes), if the autonomous travel controller 62 causes the combine harvester 1 to perform autonomous forward travel (step S46:Yes), a travel mode of the combine harvester 1 is switched from an autonomous travel mode to a manual travel mode, and the autonomous travel controller 62 finishes autonomous forward travel based on the travel settings (step S47), and the traveling part 2 continues traveling while maintaining a traveling state at the time when the autonomous forward travel is finished and is transited to manual travel (step S48).

On the other hand, when the operator operates the main gearshift lever 30 in the forward travel speed change area 35 (step S45:Yes), if the autonomous travel controller 62 causes the combine harvester 1 to perform autonomous backward travel (step S46:No), the travel mode of the combine harvester 1 is switched from the autonomous travel mode to a manual travel with limitation mode, and the autonomous travel controller 62 finishes the autonomous backward travel based on the travel settings (step S49) to cause the traveling part 2 to transit to the manual travel with limitation (step S50). In the third alternative example, first, operations of steps S51 through S55 of the example of travel operation shown in FIG. 11 are similar to the operations of steps S11 through S15 of the example of travel operation shown in FIG. 5, autonomous travel is performed in the combine harvester 1.

As described above, according to the third alternative example, the autonomous travel controller 62 causes the combine harvester 1 to perform autonomous travel mode when the main gearshift lever 30 to instruct a forward-and-backward speed change of the combine harvester 1 is positioned in the forward travel speed change area 35. When the main gearshift lever 30 is operated in the forward travel speed change area 35 during autonomous forward travel in the autonomous travel mode, the travel mode is switched to the manual travel mode, and travel in the forward direction is maintained, that is, manual forward travel is performed, based on the position of the main gearshift lever 30 in the forward travel speed change area 35. On the other hand, control according to a travel direction switches to a manual travel with limitation mode and performs manual travel with limitation toward the forward travel direction with an acceleration more gently than an acceleration in the case where a forward travel set speed is directly set to the combine harvester 1 that is performing backward travel through the manual travel mode, based on operation of the steering wheel 29 and the position of the main gearshift lever 30 in the forward travel speed change area 35, when the main gearshift lever 30 is operated in the forward travel speed change area 35 during autonomous backward travel through the autonomous travel mode.

This allows the combine harvester 1 to be switched to the manual travel with a simple operation of operating the main gearshift lever 30 even when performing autonomous travel, and the turning operation of the steering wheel 29 can be applied, so that it is possible to correct a trajectory as the operator desires, thereby improving operability. In addition, even in case of correcting the trajectory during autonomous travel, it is not necessary to suspend or finish the autonomous travel, thereby improving work efficiency. Furthermore, in the case where the main gearshift lever 30 is operated during the autonomous backward travel, a travel speed of the combine harvester 1 is gradually switched from a backward travel speed to a forward set speed with a gentle acceleration, thereby reducing discomfort for the operator in operation and suppressing danger in traveling.

In the above mentioned third alternative example, an example, in which the traveling part 2 of the combine harvester 1 is switched to the manual travel with limitation toward the forward travel direction when the main gearshift lever 30 is operated during autonomous backward travel, is described. However, the present invention is not limited to this example.

In another example, when the main gearshift lever 30 is operated during autonomous backward travel, after the autonomous travel controller 62 finishes autonomous backward travel based on the travel settings, in place of the manual travel with limitation and regardless of the position of the main gearshift lever 30 in the forward travel speed change area 35, the traveling part 2 may continue traveling while maintaining the traveling state at the time when the autonomous backward travel is finished and be transited to manual backward travel. In this case, when the main gearshift lever 30 is operated to the neutral position 34, the state at the time when the autonomous backward travel is finished is canceled and the traveling part 2 transits to normal manual travel. Then, the manual travel is performed at a forward travel set speed or a backward travel set speed according to the position of the main gearshift lever 30.

In this case, a traveling mode of the combine harvester 1 may be switched from an autonomous travel mode to a manual travel with limitation mode when the main gearshift lever 30 is operated during the autonomous backward travel, and then switched from the manual travel with limitation mode to the manual travel mode when the main gearshift lever 30 is operated to the neutral position 34.

Alternatively, when the main gearshift lever 30 is operated during autonomous backward travel, after the autonomous travel controller 62 finishes autonomous backward travel based on the travel settings, in place of the manual travel with limitation and regardless of the position of the main gearshift lever 30 in the forward travel speed change area 35, operation of the traveling part 2 may be finished to stop the combine harvester 1. In this case, the traveling part 2 gently decelerates from the time when the autonomous backward travel is finished until the time when the backward travel speed becomes zero. In addition, after the combine harvester 1 is stopped, when the main gearshift lever 30 is operated to the neutral position 34, the traveling part 2 is transited to normal manual travel. Then, the manual travel is performed in the combine harvester 1 at a forward or backward travel set speed set according to the position of the main gearshift lever 30.

In the embodiment described above, when the combine harvester 1 performs autonomous travel according to the travel route, it is assumed that the main gearshift lever 30 is positioned in the forward travel speed change area 35, and an example, in which through autonomous backward travel, backward travel speed is set to the traveling part 2 based on a speed set value set according to the position of the main gearshift lever 30 in the forward travel speed change area 35 and the set vehicle speed, is described. However, the present invention is not limited this example. For example, when the autonomous travel controller 62 performs autonomous forward travel of the combine harvester 1 according to the travel route, if the main gearshift lever 30 is shifted from the forward travel speed change area 35 to the backward travel speed change area 36, the autonomous travel controller 62 may cause the combine harvester 1 to perform autonomous backward travel according to the travel route at a backward travel set speed based on a speed set value according to the position of the main gearshift lever 30 in the backward travel speed change area 36 and the set vehicle speed. In this case, the autonomous travel controller 62 accelerates or decelerates the backward travel set speed according to the position of the main gearshift lever 30 in the backward travel speed change area 36 to set it to the traveling part 2.

In the above mentioned embodiments, an example, in which the controller 50 of the combine harvester 1 functions as field information setting unit 60, travel route creation unit 61, autonomous travel controller 62, and autonomous reaping controller 63, but the present invention is not limited to this example. For example, in another embodiment, the mobile terminal 53 may be configured to function as field information setting unit 60, travel route creation unit 61, autonomous travel controller 62, and autonomous reaping controller 63. In other words, the autonomous operation system according to the present invention may apply at least one of the controller 50 and the mobile terminal 53 of the combine harvester 1 so as to function as field information setting unit 60, travel route creation unit 61, autonomous travel controller 62, and autonomous reaping controller 63, and switch the travel mode from the autonomous travel mode to the manual travel mode without stopping the vehicle when the steering wheel 29 is operated during autonomous travel.

In the embodiments described above, an example, in which the work vehicle of the present invention is constituted of an auto-detachable type combine harvester 1, is described, but the present invention is not limited to this example. The work vehicle of the present invention may be a riding work vehicle such as normal type combine harvester, tractor, riding mower, riding rice transplanter, carrier vehicle, snowplow, wheel loader, or an unmanned work vehicle such as an unmanned mower.

The invention can be modified as appropriate to the extent without departing form the gist or spirit of the invention that can be read out from the claims and the entire specification, and autonomous operation method, work vehicle and autonomous operation system modified in such a way are also included in the technical scope of the present invention.

REFERENCE SIGNS LIST

1 Combine harvester (work vehicle)
2 Traveling part

9 Steering part
12 Power transmission mechanism
29 Steering wheel (turning operation tool)
30 Main gearshift lever (speed changing tool)
50 Controller
51 Memory unit
53 Mobile terminal
60 Field information setting unit
61 Travel route creation unit
62 Autonomous travel controller
63 Autonomous reaping controller

The invention claimed is:

1. An autonomous operation method of a work vehicle capable of switching between a manual travel mode to travel based on operation of an operation tool including a turning operation tool and an autonomous traveling mode to travel based on a predetermined travel route, the method comprising:

turning the work vehicle according to turning operation of the turning operation tool provided on the work vehicle; and controlling travel of the work vehicle based on the travel route through performing the autonomous travel mode, wherein when the turning operation tool is operated during the autonomous travel mode, the autonomous travel mode is switched to the manual travel mode without stopping the work vehicle, the autonomous operation method wherein the controlling includes:

performing the autonomous travel mode when a speed changing tool to instruct a forward-and-backward speed change of the work vehicle is positioned in a forward travel speed change area;

switching to the manual travel mode and performing manual forward travel based on the position of the speed changing tool in the forward travel speed change area when the turning operation tool is operated during the autonomous travel mode in a forward travel direction, and switching to a manual travel with limitation mode and performing manual travel with limitation toward the forward travel direction with a gentler acceleration than an acceleration in the case where a forward travel set speed is directly set to the work vehicle which is performing backward travel through the manual travel mode, based on operation of the turning operation tool and the position of the speed changing tool in the forward travel speed change area when the turning operation tool is operated during the autonomous travel mode in a backward travel direction.

2. The autonomous operation method according to claim 1 further comprising switching the manual travel with limitation mode to the manual travel mode when a predetermined cancel operation is performed during operation of the manual travel with limitation mode.

3. The autonomous operation method according to claim 2, wherein when a cancellation operation unit provided on the work vehicle is operated during the manual travel with limitation mode, the manual travel with limitation mode is switched to the manual travel mode.

4. The autonomous operation method according to claim 2, wherein when the turning operation tool is operated by an operation amount not less than a predetermined operation amount threshold per a predetermined unit time during the manual travel with limitation mode, the manual travel with limitation mode is switched to the manual travel mode.

5. An autonomous travel method for a work vehicle capable of switching between a manual travel mode to travel based on operation of an operation tool including a turning operation tool and an autonomous traveling mode to travel based on a predetermined travel route, having a turning instruction process for turning the work vehicle in response to the turning operation of the turning operating tool provided on the work vehicle, an autonomous travel control process for executing the autonomous travel mode and controlling the travel of the work vehicle based on the travel route, wherein when the turning operating tool is operated during execution of the autonomous travel mode, the autonomous travel mode is switched from the autonomous travel mode to the manual travel mode without stopping the vehicle, and an autonomous operation method, wherein the controlling includes:

performing the autonomous travel mode when a speed changing tool to instruct a forward-and-backward speed change of the work vehicle is positioned in a forward travel speed change area;

switching to the manual travel mode and performing manual forward travel based on the position of the speed changing tool in the forward travel speed change area, when the turning operation tool is operated during the autonomous travel mode in a forward travel direction; and maintaining travel in a backward travel direction, regardless of the position of the speed changing tool in the forward travel speed change area, when the turning operation tool is operated during the autonomous travel mode in the backward travel direction.

6. An autonomous operation method:

wherein a work vehicle capable of switching between a manual travel mode in which the work vehicle travels based on the operation of an operating tool including a turning operating tool, and an autonomous travel mode in which the work vehicle travels based on a predetermined travel route, having a turning instruction process for turning the work vehicle in response to the turning operation of the turning operating tool provided on the work vehicle, and an autonomous travel control process for executing the autonomous travel mode and controlling the travel of the work vehicle based on the travel route, when the turning operating tool is operated during execution of the autonomous travel mode, the autonomous travel mode is switched from the autonomous travel mode to the manual driving mode without stopping the vehicle, performing the autonomous travel mode when a speed changing tool to instruct a forward-and-backward speed change of the work vehicle is positioned in a forward travel speed change area;

maintaining travel through the autonomous travel mode in a forward travel direction based on the position of the speed changing tool in the forward travel speed change area, when the speed changing tool is operated in the forward travel speed change area during the autonomous travel mode in the forward travel direction; and switching to a manual travel with limitation mode and performing manual travel with limitation toward the forward travel direction with an acceleration more gently than an acceleration in the case where a forward travel set speed is directly set to the work vehicle that is performing backward travel through the manual travel mode, based on operation of the turning operation tool and the position of the speed changing tool in the forward travel speed change area, when the speed changing tool is operated in the forward travel speed change area during the autonomous travel mode in a backward travel direction.

\* \* \* \* \*